May 20, 1941.  A. M. WOLF  2,242,494
VENTILATING AND COOLING SYSTEM FOR MOTOR VEHICLES
Original Filed April 7, 1932  2 Sheets-Sheet 1
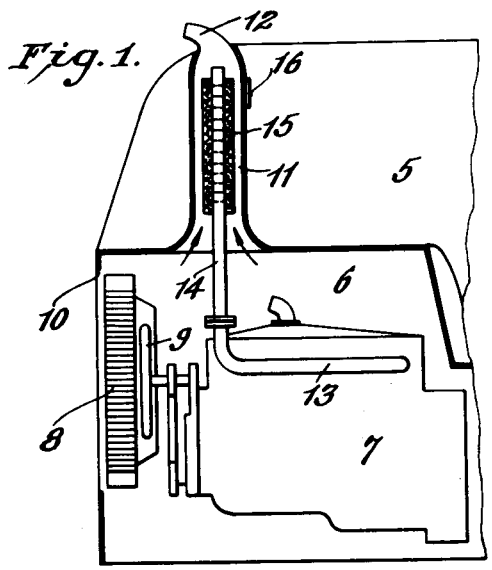
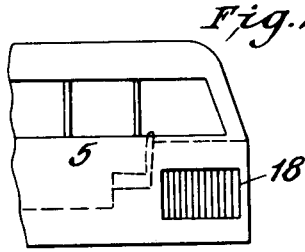
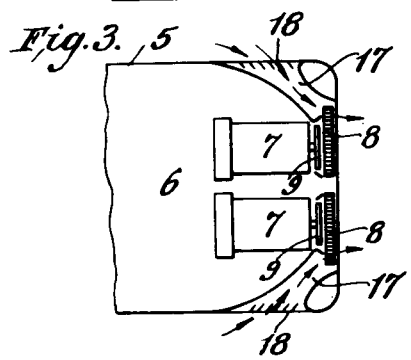
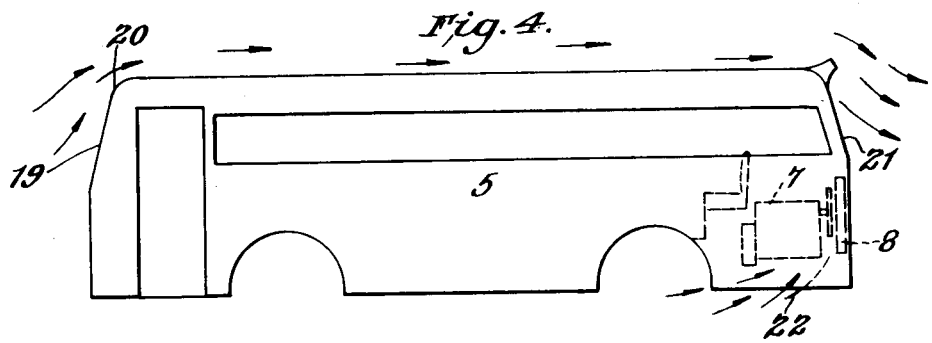
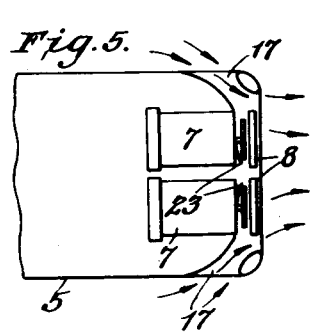
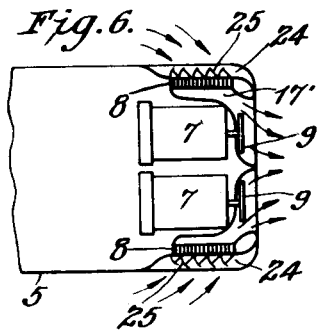
INVENTOR
Austin M. Wolf,
BY
ATTORNEY

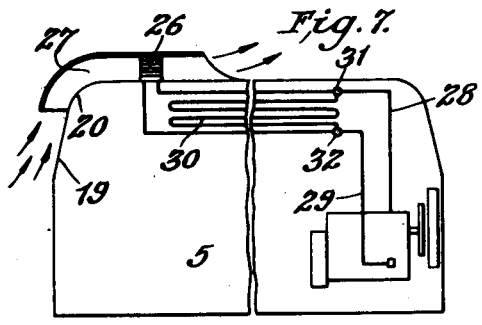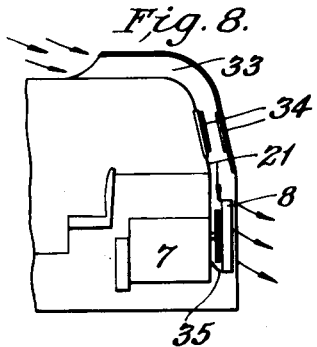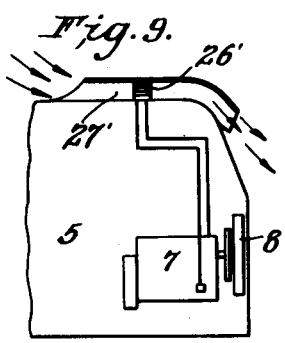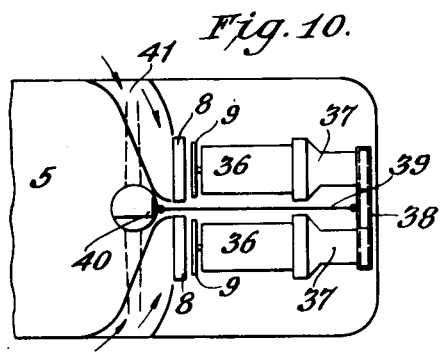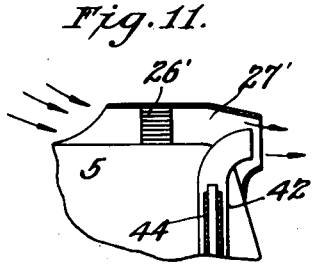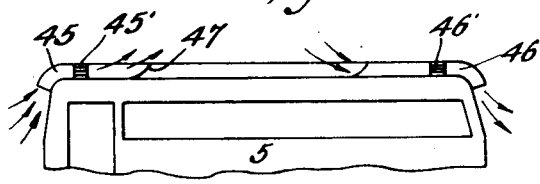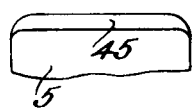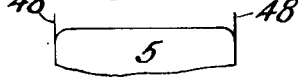

Patented May 20, 1941

2,242,494

UNITED STATES PATENT OFFICE 2,242,494

VENTILATING AND COOLING SYSTEM FOR MOTOR VEHICLES

Austin M. Wolf, Plainfield, N. J.

Original application April 7, 1932, Serial No. 603,701. Divided and this application October 10, 1938, Serial No. 234,263

5 Claims. (Cl. 180—54)

This invention relates to ventilating and cooling systems for motor vehicles and has for its primary object and purpose to provide an efficiently operating system of this character in which air streams induced by the forward motion of the vehicle are effectively utilized for dispelling or dissipating heat from the engine radiator cores.

It is another object of the invention to provide such a system of particular advantage for use in connection with motor vehicle coaches in which one or more motors or engines are mounted at the rear end of the vehicle body, and which provides means whereby in addition to cooling the radiator cores, the heated air is also withdrawn and dispelled from the engine compartment.

In one practical embodiment of the invention, I utilize the ejector action of the engine exhaust gases for creating an eduction effect through a passage extending from the engine compartment through the roof of the vehicle body for the purpose of augmenting the flow of cool exterior air through the radiator core and also withdrawing the heated air from the engine compartment and discharging the same above the roof of the vehicle.

Other novel features of the present disclosure include a vehicle body of such construction as to create a streamline flow of air thereover and concentrate the vacuum effect at the rear end of the vehicle over the area of the engine radiators; to provide the vehicle body at one end with spaced walls forming an air conduit or passage opening above the vehicle body and said walls having windows therein, and to provide a water circulating system, in which the radiators are mounted in air receiving passages or conduits on the top or roof of the vehicle body.

With the above and other objects in view, the invention consists in the improved ventilating and cooling system for motor vehicles and in the form, construction and relative arrangement of the several parts thereof, as will hereinafter be more fully described, illustrated in the accompanying drawings and subsequently incorporated in the subjoined claims.

In the drawings wherein I have illustrated several simple and satisfactory embodiments of the invention and in which similar reference characters designate corresponding parts throughout the several views:

Fig. 1 is a vertical sectional view through the motor compartment of a coach or bus, showing one embodiment of the present invention.

Figs. 2 and 3 are semi-diagrammatic side elevation and plan views respectively, illustrating another construction.

Fig. 4 is a side elevation of a coach body constructed to produce a concentrated vacuum effect at the rear end thereof over the area of the engine radiators.

Figs. 5 and 6 are semi-diagrammatic fragmentary plan views illustrating further modifications.

Figs. 7, 8 and 9 are similar vertical sectional views of other alternative arrangements.

Fig. 10 is a semi-diagrammatic plan view showing another modification.

Fig. 11 is a fragmentary vertical section showing the ventilating and exhaust system of Fig. 1 combined with a roof mounted radiator, and, Figs. 12, 13 and 14 are diagrammatic views illustrating the roof construction for directing air currents through the radiators.

While, for purposes of illustration, I have illustrated my present invention as applied to a motor coach or bus, it is to be understood that many of the novel features thereof may also be advantageously used in connection with other types of motor vehicles.

Referring first to Fig. 1 of the drawings, 5 indicates the rear end portion of a motor coach body which is constructed to provide the compartment 6 in which one or more engines or motors 7 are suitably mounted upon the vehicle frame or chassis (not shown). With each of the engines, the customary radiator 8 and fan 9 are associated, said radiator being mounted and arranged closely adjacent to the opening 10 in the rear end wall of the compartment 6.

A passage or flue 11 extends vertically upward from the top of the engine compartment and has a constricted outlet 12 at its upper end projecting rearwardly through the top or roof of the vehicle body.

To the exhaust manifold 13 of the engine, the exhaust pipe 14 is suitably connected at its lower end and extends centrally upwardly within the passage 11, terminating adjacent the outlet 12 thereof. The upper end portion of this exhaust pipe is provided with a suitable muffler 15. In the present instance, this muffler is of the sound absorbing type, in which a perforated section of the pipe 14 is enclosed within a jacket of mineral wool. This jacket, is suitably spaced from the wall of the flue 11 so as to permit of the free passage of heated air upwardly between the flue wall and the exhaust muffler.

It will be evident from the above description that the high velocity exhaust gases issuing from the upper end of the pipe 14, in their passage through the constricted flue outlet 12 produce an eduction effect through said passage, thereby withdrawing and discharging above the vehicle roof, heated stagnant air collecting in the upper portion of the engine compartment. At the same time, the inward flow of exterior air through the radiator core 8 is augmented, thereby dissipating the heat therein and also discharging the same upwardly through the flue 11.

The ejector effect of the exhaust gases may also be utilized for the purpose of ventilating the passenger compartment of the vehicle body by providing the wall of the flue 11 with an opening therein controlled by the door, indicated at 16, so that vitiated air within the passenger compartment may also be drawn within the flue 11 and discharged through the outlet 12 thereof.

In Fig. 3 of the drawings I show the vehicle body 5 provided at its rear end and at each corner thereof, with diagonally extending internal air passages 17 opening at one of their ends, as at 18, upon the opposite sides of the vehicle body, so that in the forward movement of the vehicle there is an inward flow of cold air through each of these passages, as indicated by the arrows. The ingress ends of said passages may, if desired, be provided with suitable adjustable vanes for controlling the volume of air flowing therethrough.

It will be noted that the water circulating radiator 8 of each engine is offset transversely with respect to the center line of the engine so that a greater portion of the radiator core projects towards the outer side wall of the vehicle body than toward the longitudinal center line thereof. Thus, as shown, an appreciable section of the radiator core extends over the rear open end of one of the air passages 17. Thus while the center portions of the cores receive the benefit of the air blasts of the respective fans 9, the remaining portions thereof receive the air drafts entering from the opposite sides of the vehicle body and discharged rearwardly thereof through the passages 17. These passages have a vertical dimension substantially equal to that of the radiator cores and the walls thereof are so formed as to produce a venturi effect, resulting in a less turbulent and smoother flow of the air currents than would otherwise occur. By reason of this construction, water circulating radiators of comparatively large capacity may be used without increasing the size of the fans with proportionate increase in the load on the engine.

In Fig. 4 of the drawings I have illustrated a motor coach body having its front wall in which the windshield is located sloping upwardly and rearwardly, as indicated at 19, and connected with the top surface of said body by the large radius top corner 20. At its rear end, the vehicle body wall is provided with a similar sloping portion 21. Thus in the forward motion of the vehicle, a smooth streamline flow of air occurs, as indicated by the arrows, and the sloping portion 21 at the rear end of the vehicle body induces a continuous smooth flow of the air beyond the vehicle top, instead of creating a violent vacuum which results from the ordinary vertically straight rear end. By thus relieving the vacuum by the down flow of air from the top of the vehicle with the side flow of air discharging rearwardly through the radiator cores, as in Fig. 3, the vacuum effect at the rear of the body is concentrated over the projected area of the engine radiators and thus plays an important part in the operation of the cooling system. It will, of course, be understood that in the rearward discharge of the air through the passages 17, heated air is also withdrawn from the engine compartment 6 and discharged through the rear end of the vehicle body.

It will thus be seen that by streamlining the body construction of the vehicle to prevent the formation of a vacuum directly at the radiators, I succeeded in utilizing most effectively the operation of the cooling fans and the vacuum effect to create an ample air flow through the radiator cores. If it is desired to furnish an additional air supply to the fans 9 a baffle or deflector, indicated at 22, may be suitably mounted in the vehicle body below the engine to deflect and direct air upwardly near the ground. In the arrangement shown in Fig. 5, the radiators 8 are centered with respect to the respective engines and the inner walls of the respective passages 17 extend across the front ends of the engine cylinder blocks, as indicated at 23, to thus supply the air entering the passages 17 across substantially the full extent of the respective radiators 8.

In Fig. 6 I show an arrangement in which the radiators 8 are located on opposite sides of the vehicle body and at the inner sides of the recessed portions 24 of the body walls, said recesses extending the vertical height of the radiators. The air passages 17' extend transversely from the inner side of each radiator 8 and open through the rear end of the vehicle body, the inner walls of said air passages extending between the cooling fans 9 and the cylinder blocks so that said fans operate within the rear ends of the passages 17'. The streamline effect produced by the walls of these passages induces the entrance of air currents through the radiators from each side of the vehicle, and the fans 9 operate to augment this effect as well as discharge the heated air directly through the rear of the vehicle body. The recesses 24 permit the arrangement of adjustable vertical air deflecting vanes 25 at the outer side of each of the radiators 8 so that in the full open position of these vanes, they will not project beyond the outer surfaces of the side walls of the vehicle. The adjustment of these vanes may either be manually controlled or through the medium of a suitable thermostat subject either by the heat of the cooling water or of the air in the engine compartment. The vertically disposed vanes 25 successively increase in width from front to rear so as to insure full effective action by each vane in directing air currents through the radiator core in the forward movement of the vehicle.

In Fig. 7 of the drawings, I show a water cooling system for the engine in which a radiator 26 of suitable form is mounted upon the roof of the vehicle body within a longitudinally extending air passage or conduit 27 thereon. The front end of this conduit is concentric with the curved top corner 20 of the vehicle body and has a downwardly facing ingress end at the upper end of the sloping front wall 19. Therefore, in the forward travel of the vehicle, a strong current of air is directed upwardly by this sloping wall into the passage 27 and through the core of the radiator 26. As indicated, this passage terminates a short distance rearwardly of the radiator. The outlet pipe 28 and the return pipe 29 of the water cooling system are connected with the radiator, and circulation of the water is controlled through a pipe coil 30 connected at its ends with the outlet and return pipes by means of the valves indicated at 31 and 32 respectively. These valves may be thermostatically actuated to regulate the flow of water through the radiator, in accordance with temperature changes in the engine compartment.

In Fig. 8 I show a means for supplying air in large volume to the engine radiator 8 at the rear of the vehicle body, which consists in the air passage or duct 33 extending longitudinally upon the rear end of the vehicle top and downwardly over the sloping end wall 21. This wall, and the opposing spaced wall of the passage 33 are provided with glass windows 34. The upper end of the passage 33 opens forwardly to the external atmosphere while the lower end of said passage is in communication with the external atmosphere immediately above the radiator 8. Heated air rising from the radiator into this passage and mixing with the air flowing downwardly therethrough acts to keep the surfaces of the glass windows 34 free of rain or snow. Below the radiator fan a curved deflector 35 may be arranged to deflect the air rearwardly through the lower portion of the radiator.

In Fig. 9, I show a similar arrangement to that of Fig. 7 at the rear end of the vehicle body, the roof radiator 26' being enclosed within the longitudinal passage or duct 27' which discharges downwardly at the rear of the vehicle body to reduce the vacuum effect when the vehicle is in motion, as above explained.

In Fig. 10, the engines 36 are mounted at the rear of the vehicle body in reversed relation to the arrangements previously described, the radiators 8 and the fans 9 being located at the forward ends of the engine cylinder blocks. The gear boxes 37 of the engines at the rear ends thereof are connected by the transfer case 38 and the propeller shaft 39 conveys the power from the transfer gearing to the differential 40 of the rear vehicle axle. In this case, the air passages 41 at their ingress ends open on the opposite sides of the vehicle body and their egress ends terminate closely contiguous to the front surfaces of the radiators 8. The walls of these passages are so formed as to direct and concentrate the flow of air entirely through the radiator cores. After passing rearwardly of the radiators, the air currents flow over the respective engine cylinder blocks and carry off the heated air through a suitably screened opening at the rear of the vehicle.

In Fig. 11, I have shown the roof radiator 26' enclosed within the rearwardly discharging air passage 27', and the vertical passage 42 from the engine compartment enclosing the exhaust muffler 44 as in Fig. 1, discharging rearwardly into the rear open end of the passage 27'. Thus the same ejector effect will be obtained inducing a greater flow of air through the radiator 26'.

Fig. 12 diagrammatically illustrates an arrangement of air ducts or passages 45 and 46 respectively, at each end of the vehicle roof with a water circulating radiator 45' and 46' in each of said passages. As indicated in Fig. 13, these ducts or passages may extend across the full width of the vehicle top and be rounded off at their opposite side edges to blend into the side walls of the vehicle body. The bottom wall of the front duct 45 at its rear end is curved upwardly as at 47 so as to discharge the air in an upward direction. As shown in Fig. 14, in order to preserve the appearance of the vehicle body, upstanding flanges or walls 48 may be provided at the opposite sides thereof between the spaced ducts or passages 45 and 46.

The subject matter of this application is a division of an application for patent filed by me on April 7, 1932, Ser. No. 603,701, now Patent No. 2,132,450, dated October 11, 1938.

From the foregoing description considered in connection with the accompanying drawings the construction, manner of operation and several advantages of my present invention will be fully understood. It will be seen that the invention is essentially characterized by the provision of a motor vehicle body having an air passage in communication at each of its ends with the external atmosphere, in combination with an engine cooling system including a radiator mounted and arranged in the path of the air stream flow through said passage. Thus the radiator will be efficiently cooled and the heat dissipated therefrom. This feature is of particular importance in connection with motor driven coaches or buses having radiators of large capacity. It will further be seen that my invention provides for the utilization of the exhaust gases to induce a continuous discharge of heated air from the engine compartment and also augment the flow of cooling air through the radiator core. By reason of the discharge of the exhaust above the roof of the vehicle the deleterious effects of such exhaust discharge upon pedestrians in the vicinity of the vehicle is obviated.

I have herein disclosed several simple and practical embodiments of my present improvements. However it is to be understood that the essential features thereof might also be incorporated in still other alternative structural forms and I accordingly reserve the privilege of resorting to all such legitimate changes in the form, construction and relative arrangement of the several parts as may fairly be comprehended within the spirit and scope of the appended claims.

I claim:

1. In combination with a motor vehicle body having a passage at one end of the body in communication at its opposite ends with the external atmosphere and receiving an air stream in the forward movement of the vehicle, said passage at one end thereof having vertically extending spaced walls each provided with a window, and said windows being in opposed relation to each other, and an internal combustion engine having a water cooling system including a radiator mounted and arranged at the egress end of said passage in the path of flow of the air stream.

2. A motor vehicle body having an engine compartment at one end, and spaced apart walls forming an air passage extending upwardly from said compartment, and opposed windows in the walls of said passage.

3. A vehicle body having a power unit compartment communicating with the external atmosphere through the rear end of said body, said body being further provided with an air inlet and an air passage connecting said inlet with the compartment rearwardly of the power unit to directly discharge air entering said passage through the rear end of the vehicle body and thereby withdraw heated air from said compartment.

4. A vehicle body having body walls forming a power unit compartment at the rear end thereof, said compartment opening through the rear end of the body to the atmosphere, said body being further provided with an air inlet, and an air passage leading therefrom to the rear open end of said compartment, said passage having a side wall terminating at the egress end of the passage closely adjacent to the power unit.

5. A vehicle body having body walls forming a power unit compartment at the rear end thereof, said compartment opening to the atmosphere through the rear end of the body, said body being further provided with an air inlet at the top thereof and an air passage leading downwardly from said inlet to said compartment and having a vertically extending side wall terminating at its lower end closely adjacent to the power unit.

AUSTIN M. WOLF.